United States Patent [19]

Davey

[11] Patent Number: 5,639,127
[45] Date of Patent: Jun. 17, 1997

[54] FLEXIBLE COUPLER APPARATUS

[75] Inventor: Mark John Davey, N. Aurora, Ill.

[73] Assignee: Senior Engineering Investments AG, Schaffhausen, Switzerland

[21] Appl. No.: 569,354

[22] Filed: Dec. 8, 1995

[51] Int. Cl.⁶ .................................................. F16L 11/12
[52] U.S. Cl. ........................... 285/49; 285/226; 285/300
[58] Field of Search ........................... 285/49, 226, 299, 285/300, 301, 223, 233, 234

[56]  References Cited

U.S. PATENT DOCUMENTS

| | | | |
|---|---|---|---|
| 4,792,161 | 12/1988 | Usui | 285/223 X |
| 5,013,072 | 5/1991 | Roth | 285/233 |
| 5,145,215 | 9/1992 | Udell | 285/226 X |
| 5,358,287 | 10/1994 | Winzen | 285/300 X |

FOREIGN PATENT DOCUMENTS

| | | | |
|---|---|---|---|
| 575727 | 12/1993 | European Pat. Off. | 285/49 |
| 542208 | 12/1941 | United Kingdom | 285/223 |

*Primary Examiner*—Dave W. Arola
*Attorney, Agent, or Firm*—Dick & Harris

[57] ABSTRACT

A flexible coupler apparatus for joining successive lengths of pipe in an exhaust system for a vehicle. A pipe inner member is insertingly received in the adjacent ends of two pipe adapter members which are affixed to respective adjacent pipe ends. A first spacer member is radially and axially enclosed between the end of one of the adapter members and the pipe inner member. A second spacer member is radially and axially enclosed between the end of the other of the adapter members and the pipe inner member. A flexible, extensible sealing member mechanically connects the adapter members, and, in turn, the pipe ends.

29 Claims, 1 Drawing Sheet

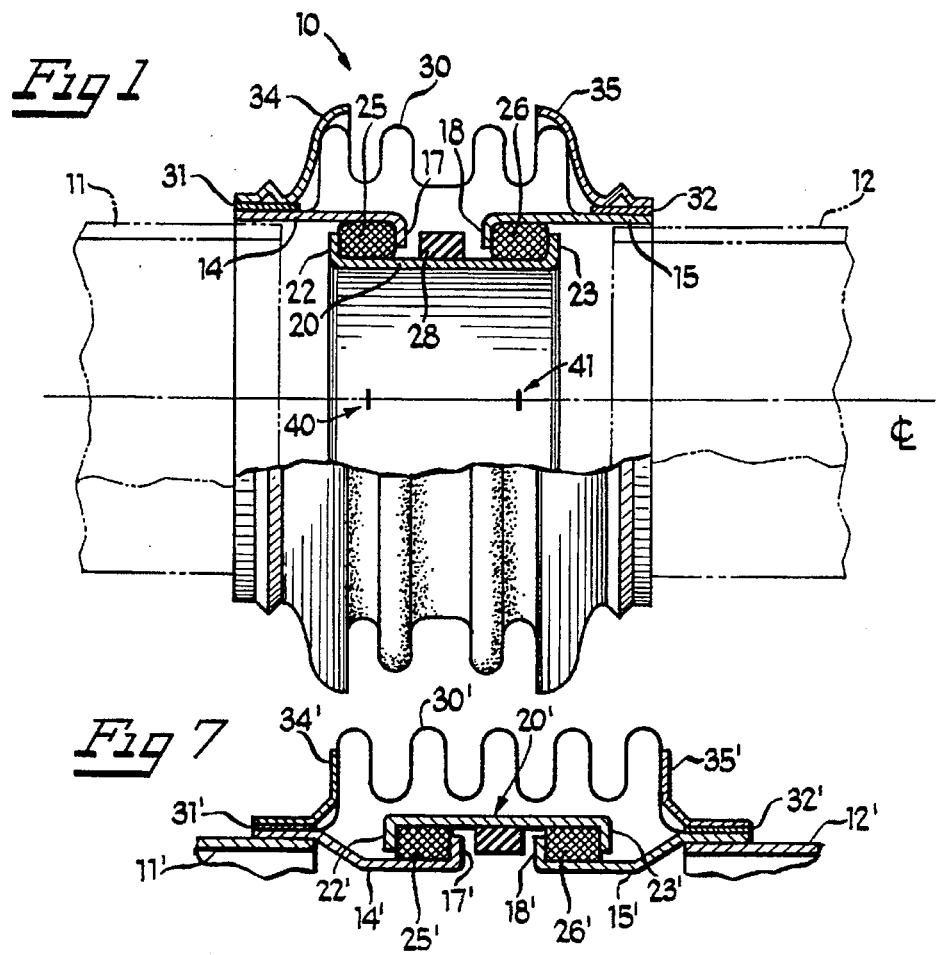
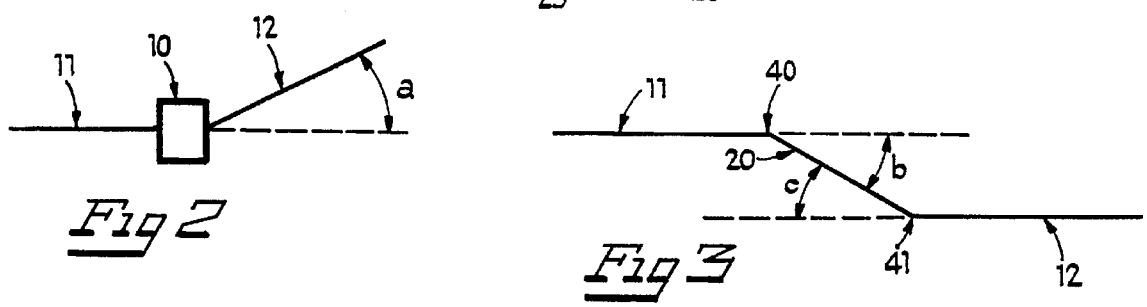
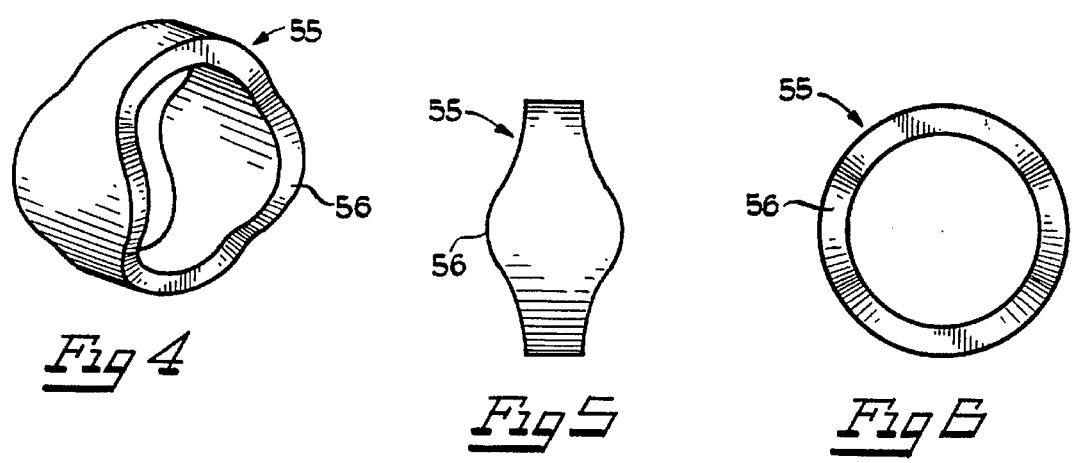

FLEXIBLE COUPLER APPARATUS

BACKGROUND OF THE INVENTION

The present invention relates to couplers for joining the ends of successive lengths of pipe or conduit, and, in particular, to couplers for joining the ends of successive pipes in an exhaust system for vehicles.

It is well known that, in vehicle exhaust systems, particularly those for heavy duty vehicles, such as large trucks or earthmoving equipment, the internal combustion (i.c.) engines produce a significant amount of vibration in the exhaust pipes. Operation of the motors at continuous speeds for prolonged periods of time can, especially, produce what are known as harmonic vibrations which can cause significant deflections in extended lengths of exhaust pipe. Repeated deflections of the exhaust pipe will, in turn, cause the pipe to weaken with time and ultimately fail. Further, such harmonic vibrations will also be transmitted through the exhaust pipes to the mounting of the pipes, promoting the loosening of the mountings, which can result in the sudden displacement of one or more components of the exhaust system, with the potential for both personal injury and equipment damage.

In addition to the vibrations created by the motor of the vehicle, an exhaust system is also subjected to various tension, compression and bending forces which arise during the operation of the vehicle. While individual components might be made stronger and more massive to resist failure by fatigue, such construction would be undesirable due to weight considerations. Further, by making individual elements stiffer, the vibrations are merely transmitted to the exhaust system mountings or other components, not reduced or eliminated. Accordingly, it is desirable to isolate the exhaust system, or at least components of the system from such vibrations and forces.

It is known that if the pipes of an exhaust system are divided and separated by non-rigid connections, rather than as continuous extended lengths, the development of harmonic vibrations from the motor is precluded or reduced. Such non-rigid connections can be advantageously employed to absorb other tension, compression and bending forces, apart from and in addition to motor vibrations.

It is therefore desirable to provide a coupler for joining successive lengths of exhaust pipe, which coupler joins the pipes in a non-rigid fashion and is capable of absorbing tension, compression and bending forces, without transmitting them from one pipe to another.

An example of a prior art coupler is found in Usui, U.S. Pat. No. 4,792,161. In Usui, a pair of concentrically arranged spring coils are utilized to provide a mechanical connection between the pipes to be joined. One drawback of the coupler in Usui is that when the coils are in a stretched or bent configuration, gaps may form between individual bights of the coil, into which dirt, debris and moisture may invade, which may interfere with the operation of the coils, through abrasion, rusting and so forth. In addition, the coils (which are arranged one threaded within the other) are unprotected and exposed to the elements at all times, and are thus susceptible to damage from abrasion and other harmful physical contact. A further drawback of the coupler apparatus of Usui is that a sealing ring positioned between the overlapping pip ends, is relied upon to provide sealing means to prevent escape of the exhaust gases. The sealing ring is subjected to cyclical flexure, tension and compression forces which will ultimately compromise the seal and require replacement of the coupler.

Yet another prior art coupler apparatus is disclosed in Udell, U.S. Pat. No. 5,145,215. In Udell, an inner sleeve member is concentrically received by an outer sleeve member. A substantially porous, non-sealing, vibration absorbing spacer member is arranged between the sleeve members where they overlap, to preclude direct contact between the sleeve members. The spacer member is non-sealing to preclude deterioration while minimizing interference with the reciprocation and articulation of the sleeve members. A flexible, extensible bellows member mechanically connects the sleeve members at their distant non-overlapped ends. A closure member, typically of braided metal wire, surrounds the bellows member for protecting the extensible bellows member from damage from external elements and forces.

While the apparatus of the Udell patent is capable of accommodating extension, compression and relative pivoting of the pipe ends which are connected, the Udell apparatus has but a single "pivot point" and accordingly, does have a limit as to the amount of relative pivoting which can be accommodated. Further, within the limits of compressibility of the spacer member, the axes of the two pipes which are connected, cannot move to a non-intersecting (i.e., skewed) relationship. Still further, the apparatus of Udell is better adapted for the accommodation of extension, than it is to the accommodation of compression. In the possible, though typically uncommon, event of overcompression of the coupler, there is a possibility of jamming or distortion of components, which may adversely affect the subsequent performance of the coupler, and may even lead to premature degradation and failure of the coupler. There is no positive "stop" structure provided, to prevent such jamming.

It would be desirable to provide a flexible coupler apparatus which has an enhanced, more robust configuration, in order to provide for the decoupling of an exhaust system from a source of vibration, such as an i.c. engine.

It would also be desirable to provide a flexible coupler apparatus for exhaust systems which accommodates the orientation of the ends of the pipes to be connected into a non-intersecting (skewed) relationship.

It would still further desirable to provide a flexible coupler apparatus which is provided with structure which will provide an affirmatively acting stop against overcompression of the coupler apparatus.

These and other objects of the invention will become apparent in view of the present specification, claims and drawings.

SUMMARY OF THE INVENTION

The present invention is directed to a flexible coupler apparatus for connecting adjacent ends of successive pipes to direct fluid flow from one of the two pipes to the other of the two pipes, while precluding transmission of vibration between the two pipes.

The flexible coupler apparatus comprises a first adapter member having a first end configured to be operably affixed to a first one of the two pipes, and a second free end and a second adapter member having a first end configured to be operably affixed to a second one of the two pipes, and a second free end. The second free ends of the first and second adapter members are normally disposed in an axially spaced relationship, when the first and second adapter members are affixed to the first and second pipes, respectively, and the coupler apparatus is in an unstressed state.

An inner member is provided, having two free ends, which are insertingly received in respective ones of the second free ends of the first and second adapter members.

The two free ends of the inner member are further circumferentially surrounded by the second free ends of the first and second adapter members, respectively.

At least first and second resilient spacer members are operably disposed between a first free end of the inner member and the a free end of one of the first and second adapter members, and a second free end of the inner member and a free end of the other of the first and second adapter members, respectively, for absorbing vibrations originating from one of the first and second pipes, and for precluding transmission of the vibrations to the other of the pipes. The at least first and second resilient spacer members are radially enclosed between at least the respective two free ends of the inner member and respective ones of the first and second adapter members, respectively. At least a portion of each of the at least first and second resilient spacer members are further operably disposed for axial movement relative to at least one of the inner member, the first adapter member and the second adapter member, respectively.

A resilient sealing member is at least indirectly affixed to the first and second pipes, to preclude escape of fluid from the flexible coupler apparatus and for maintaining the first and second pipes in flexibly joined relation to each other to accommodate and enable substantial compressive and extensive axial movement of the first and second pipes relative to one another, as to accommodate orientation of the pipes such that longitudinal axes thereof are positioned in a non-intersecting relationship.

In a preferred embodiment of the invention, at least one stop member is operably disposed about the inner member and operably configured to prevent direct axially abutting contact between the first and second adapter members.

The resilient sealing member further comprises a flexible tubular bellows member having formed thereon a plurality of circumferential undulations along its length.

Each spacer member preferably comprises a resilient annular member fabricated from metal wire mesh. Alternatively, each spacer member comprises a resilient annular member fabricated from ceramic wool material.

The invention further comprises a flexible coupler apparatus for connecting adjacent ends of successive pipes to direct fluid flow from one of the two pipes to the other of the two pipes, while precluding transmission of vibration between the two pipes, in which the flexible coupler apparatus comprises a first adapter member having a first end configured to be operably affixed to a first one of the two pipes, and a second free end. A second adapter member has a first end configured to be operably affixed to a second one of the two pipes, and a second free end. The second free ends of the first and second adapter members are normally disposed in an axially spaced relationship, when the first and second adapter members are affixed to the first and second pipes, respectively, and the coupler apparatus is in an unstressed state. An inner member has two free ends, which are insertingly received in respective ones of the second free ends of the first and second adapter members. The two free ends of the inner member are further circumferentially surrounded by the second free ends of the first and second adapter members, respectively.

At least first and second resilient spacer members are operably disposed between a first free end of the inner member and a free end of one of the first and second adapter members, and a second free end of the inner member and a free end of the other of the first and second adapter members, respectively, for absorbing vibrations originating from one of the first and second pipes, and for precluding transmission of the vibrations to the other of the pipes. The at least first and second resilient spacer members are radially enclosed between at least the two free ends of the inner member and respective ones of the first and second adapter members. At least a portion of each of the at least first and second resilient spacer members are further operably disposed for axial movement relative to at least one of the inner member, the first adapter member and the second adapter member.

A resilient sealing member is at least indirectly affixed to the first and second pipes, to preclude escape of fluid from the flexible coupler apparatus and for maintaining the first and second pipes in flexibly joined relation to each other to accommodate and enable substantial compressive and extensive axial movement of the first and second pipes relative to one another, as to accommodate orientation of the pipes such that longitudinal axes thereof are positioned in a non-intersecting relationship.

The resilient sealing member is operably configured to circumferentially surround and extend axially over the entirety of the inner member, the at least first and second spacer members, and at least a portion of at last one of the first and second adapter members, and overlap at least a portion of each of the two pipes.

In an alternative preferred embodiment of the invention, the at least one stop member is both operably disposed about and affixed to the inner member and operably configured to prevent direct axially abutting contact between the first and second adapter members.

At least one of one stop member alternatively comprises an annular member, having an axial width around its circumference, wherein at at least one region along the circumference, the axial width is substantially greater than at other regions along the circumference.

In an embodiment of the invention, at least one of the spacer members is affixed to the inner member. In an embodiment of the invention, at least one stop member is affixed to the inner member.

In a still further alternative embodiment of the invention, a flexible coupler apparatus is provided for connecting adjacent ends of successive pipes to direct fluid flow from one of the two pipes to the other of the two pipes, while precluding transmission of vibration between the two pipes.

A first adapter member has a first end configured to be operably affixed to a first one of the two pipes, and a second free end. A second adapter member has a first end configured to be operably affixed to a second one of the two pipes, and a second free end. The second free ends of the first and second adapter members are normally disposed in an axially spaced relationship, when the first and second adapter members are affixed to the first and second pipes, respectively, and the coupler apparatus is in an unstressed state. An outer member is provided, having two free ends, which insertingly receive respective ones of the second free ends of the first and second adapter members, the two free ends of the outer member further circumferentially surrounding the second free ends of the first and second adapter members, respectively.

At least first and second resilient spacer members are operably disposed between a first free end of the outer member and a free end of one of the first and second adapter members, and a second free end of the outer member and a free end of the other of the first and second adapter members, respectively, for absorbing vibrations originating from one of the first and second pipes, and for precluding transmission of the vibrations to the other of the pipes.

The at least first and second resilient spacer members are radially enclosed between at least the two free ends of the outer member and respective ones of the first and second adapter members. At least a portion of each of the at least first and second resilient spacer members is further operably disposed for axial movement relative to at least one of the outer member, the first adapter member and the second adapter member, respectively. A resilient sealing member at least indirectly affixed to the first and second pipes, to preclude escape of fluid from the flexible coupler apparatus and for maintaining the first and second pipes in flexibly joined relation to each other to accommodate and enable substantial compressive and extensive axial movement of the first and second pipes relative to one another, as to accommodate orientation of the pipes such that longitudinal axes thereof are positioned in a non-intersecting relationship.

At least one stop member may be operably disposed within the outer member and operably configured to prevent direct axially abutting contact between the first and second adapter members.

BRIEF DESCRIPTION OF THE DRAWINGS

FIG. 1 is a side elevation, in section, of the flexible coupler apparatus according to the present invention;

FIG. 2 is a highly schematic illustration of the apparatus of the present invention, in place between two pipe ends, illustrating the total possible angular deflection between the pipe ends;

FIG. 3 is a slightly less schematic illustration of the apparatus of the present invention, in place between two pipe ends, illustrating the apparatus' capacity to permit non-intersecting orientation of the two pipe ends;

FIG. 4 is a perspective view of a spacer member, according to an alternative preferred embodiment of the invention;

FIG. 5 is a side elevation of the spacer member according to the embodiment of FIG. 4;

FIG. 6 is a plan view of the spacer member according to the embodiment of FIG. 4;

FIG. 7 is a fragmentary side elevation, in section, of the flexible coupler apparatus according to a further alternative embodiment of the present invention.

DETAILED DESCRIPTION OF THE DRAWINGS

While this invention is susceptible of embodiment in many different forms, there is shown herein in the drawings and will be described in detail a specific embodiment, with the understanding that the present disclosure is to be considered as an exemplification of the principles of the invention and is not intended to limit the invention to the embodiment illustrated.

FIG. 1 illustrates a side elevation, in section, of the flexible coupler apparatus 10, according to the present invention. Inasmuch as apparatus 10 is, typically in a preferred embodiment of the invention, intended to be radially symmetrical about a central axis $C_L$, only an "upper" portion of coupler apparatus 10 is illustrated, with the understanding that the "lower" portion is symmetrically disposed about axis $C_L$.

Pipe ends 11 and 12 are to be connected, in such a manner that the pipes are decoupled with respect to the transmission of vibrations from pipe end 11 to pipe end 12. Adapter members 14 and 15 are substantially cylindrical members, each having a diameter which is substantially the same as the respective pipe ends 11, 12. Adapter members 14 and 15 will be permanently affixed to ends 11, 12 by welding, brazing, or other suitable known technique. Although illustrated in FIG. 1 as having diameters which are slightly greater than ends 11 and 12, in alternative embodiments (not illustrated), adapter members 14, 15 could be configured as having diameters significantly greater than ends 11,12, slightly less than that of ends 11, 12, or even the having the same diameters as their respective ends 11,12, in which case the adapter members would be butt-welded to the respective ends. Radially inwardly extending flanges 17, 18 are formed on adapter members 14, 15.

A pipe inner member 20 is provided, which although only illustrated as one-half of a sectional elevation, is understood to be a generally cylindrical member. Inner member 20 is concentrically received radially inwardly of adapter members 14, 15. Pipe inner member 20 has a diameter which must always be less than that of adapter members 14, 15 and which may be less than that of pipe ends 11, 12. Outwardly turned flanges 22, 23 are provided on pipe inner member 20, and may be formed thereon utilizing known fabrication techniques. Pipe inner member 20 will have a short length, relative to the overall apparatus dimensions. For any given application, the length of inner member 20 will be equal to no more than one diameter of the pipe(s) which are being connected. Accordingly, the length of inner member 20 will be, at most, only slightly greater than its own diameter, and may be less.

Annular spacer members 25, 26 are preferably formed from metal mesh material, which is resilient, though somewhat porous, and relatively tightly packed. The spacer members may alternatively be fabricated from resilient heat-resistant ceramic wool material, or the like. In a preferred embodiment of the invention, while each of spacer members 25, 26 is radially compressed between inner member 20 and one of adapter members 14,15, each of spacer member 25,26 is free to engage in some axial movement along inner member 20, subject to possible restraint by flanges 17,18 of adapter members 14,15. Spacer members 25,26 will be configured to be resistively compressible, to absorb and resist lateral vibrations, and axial vibrations, both when pipes 11 and 12 are substantially collinear, and as well as when pipes 11,12 are skewed, laterally displaced relative to one another or moved by external forces so as to be rotated angularly with respect to one another, within the limits of the tolerances of the components and the maximum compressibility of the spacer members. Spacer members 25,26 need not be porous, though they must be resilient to at least some degree, in order to accomplish the desired decoupling of vibration along the pipes being connected. In addition, spacer members 25,26, if desired, may be spot welded to either adapter members 14,15, respectively, or to inner member 20, but not both.

Apparatus 10 may also be provided with an annular stop member 28, which may be affixed to the outer surface of inner member 20, preferably at a position midway along its length. Alternatively, stop member 28 may simply be positioned about inner member 20. Stop member 28 preferably will be configured from a material which may be the same material as that of spacer members 25,26 (steel mesh, ceramic wool, etc.) or may be configured from a harder or softer material, and may even be configured as a ring of ceramic, metal or elastomeric material, or other suitable durable, heat resistant material, which may be simply fitted onto inner member 20, or which may be welded or brazed, or otherwise suitably affixed, onto inner member 20. When no stop member 28 is provided for a specific apparatus 10, the construction of the remaining elements should be suitably dimensioned, for any given application, so that under expected operational limits for that given application, apparatus 10 would not be so compressed, that flanges 17 and 18 would abut. Such appropriate dimensioning would prevent the generation of "chattering" of the coupler during operation.

In a still further alternative construction, an annular spring member, such as a Belleville spring, could be substituted for stop member 28.

Bellows 30, having ends 31,32, is positioned around and sealingly affixed to adapter members 14,15 (if adapter members 14,15 are larger in diameter than ends 11, 12, as illustrated), by any of a number of known techniques, such as welding or brazing. Alternatively, bellows ends 31,32 could be affixed and sealed directly to ends 11, 12, if adapter members are insertingly received and mechanically locked within, at or to ends 11,12, or if bellows ends 31,32 extend axially beyond adapter members 14,15. The corrugated portion of the bellows 30 should be provided with enough axial length such that all of inner member 20, and spacer members 25, 26, and that portion of adapter members 14, 15, which overlap inner member 20, are encompassed within the length of the corrugated section.

Collars 34, 35 may be provided, and fitted around bellows ends 31, 32. Suitable welds, brazes and/or crimps will be employed, according to known techniques, for sealingly affixing the various components to one another.

The methods for forming and assembling the various described components follow known techniques, and may be readily accomplished by one of ordinary skill in the art, having the present disclosure before them. Accordingly, a detailed description of the forming and assembly of flexible coupler 10 is not necessary for a complete understanding of the structure and mode of operation of the present invention.

In operation, flexible coupler apparatus 10 will be installed, such that the configuration as illustrated in FIG. 1 will be substantially the normal resting state of apparatus 10. Spacer members 25,26 will not be axially compressed, though they may be radially compressed. Some axial extension of apparatus 10, resulting from the pulling apart of ends 11,12, will be accommodated, which will result in the axial compression of spacer members 25,26. Axial compression of apparatus 11 will result in one or both of flanges 17, 18, moving toward and eventually abutting optional stop member 28 (if provided). In addition, spacer members 25, 26, being resistively compressible in all directions, will, subject to the tolerances of the various components, permit some angular deflection of pipe 1, relative to pipe 2 (see FIG. 2). For example, for a connector apparatus having a nominal diameter of 2 in., a total angular deflection of 10°–12° is contemplated.

In addition, depending upon the diameter of apparatus 10, and of ends 11, 12, and the relative axial lengths of adapter members 14,15, inner member 20, and of spacer members 25, 26, among other factors, ends 11, 12 may be permitted to assume a configuration in which the separate axes of ends 11 and 12 are not intersecting, but rather are parallel or completely skewed (see FIG. 3). That is, the inner free ends of adapters 14 and 15 with flanges 17 and 18, respectively, cooperate with flanges 22,23 of inner member 20 and spacer members 25 and 26, respectively, to provide two pivoting joints, having centers of rotation generally located at points 40 and 41, respectively. Since, as described above, the overall coupler apparatus is contemplated as permitting a total angular deflection a of 10°–12°, each pivoting joint is contemplated as permitting an angular deflection b, or c, of 5°–6°, one-half the total possible deflection of 10°–12°.

With respect to each of the aforementioned modes of angular deflection, bellows member 30 will be suitably configured to accommodate all such combinations of movement, while maintaining a fluid-tight seal at each end to ensure no escape of the gases which pass through apparatus 10. In addition, bellows member 30 permits coupler apparatus 10 to be compressed or extended, as necessary, during the installation procedures, and further permit such compression or extension during operation, while maintaining a mechanical sealing connection between the pipe ends 11, 12.

In the preferred embodiment of FIGS. 1–3, stop member 28 is illustrated and contemplated as being a simple annular ring, having uniform rectangular cross-sectional configurations. In an alternative preferred embodiment of the invention (FIGS. 4, 5 and 6), the stop member 55 may be provided with widened portions 56. It is to be recognized that the widened portions are somewhat exaggerated, as illustrated in FIGS. 4–6, and that it is anticipated that the widened portions will have an axial length which is greater than the axial length of the non-widened portions, by a difference which is equal to approximately 10–20% of the total axial length of the stop member. For example, a stop member having an axial length of 8 mm at the non-widened portions may have an axial length in the widened portions of 10–12 mm. In addition, each widened portion typically preferably will cover a portion of the circumference of the stop member equal to approximately 90°–100° of arc, although lesser amounts of arc may be employed if desired. Preferably two widened portions 56 will be provided, for stop member 55, and will be located at diametrically opposed positions in the stop member 55. The widened portions would be axially bounded by flanges 17 or 18, respectively. Alternatively, additional widened portions may be provided, which would preferably be positioned at radially symmetrical locations about the circumference of the stop member. The widening is provided only in the axial direction, and the radial thickness of the stop member in such widened portions will preferably be the same (at least in the axially uncompressed state) as the non-widened portions. Through the use of a stop member, such as stop member 55, enhanced pivoting action can be obtained, without creating undue axial "looseness" in the coupler.

In a further alternative embodiment of the invention (not shown), in addition to or instead of the stop member 55 having a widened portion, the flexible coupler apparatus may be provided with one or both spacer members having widened portions. In one alternative preferred embodiment, the widening will be present only along one axial "face" of the spacer member. For example, referring to FIG. 5, presuming that item 55 were instead a spacer member, in one alternative preferred embodiment, the widening would be present only to one side of plane of symmetry S, in one or preferably both of the spacer members, the other axial face(s) remaining flat. In such an alternative embodiment, the flat face(s) would preferably be oriented to be the axially outwardly directed faces, relative to the coupler apparatus as a whole, while the face(s) having the widening would be oriented to be the axially inwardly directed faces, relative to the coupler apparatus as a whole. That is, the widened portions would face toward the center of the coupler apparatus, while the flat axial faces would face away from the center of the coupler apparatus. In a still further alternative embodiment, the spacer members would have widened portions on both axial faces, in the manner described with respect to stop member 55, of FIGS. 4–6. As previously stated, either form of widened spacer member may be utilized with or instead of the stop member having widened portions.

In any of the alternative embodiments wherein a stop member or one or more of the spacer members are provided with widened portions, then such respective stop member or spacer member would be preferably affixed to the inner member 20 by any suitable means, such as a spot weld, braze, etc.

In a still further alternative embodiment of the invention (FIG. 7), in apparatus 10' adapter members 14' and 15' will have flanges 17' and 18' which will be configured to emanate radially outwardly. While illustrated in section, in the fragmentary view of FIG. 7, it is to be understood, that the section, as illustrated, is intended to represent the cross-section of the pipe ends and that the adapter members, etc., unless otherwise described are generally cylindrical in form. The free ends of adapter members 14' and 15' may be necked, as illustrated, or may be simple cylindrical members, as illustrated in FIG. 1. Instead of an inner member 20, an outer member 20' may be provided, which circumferentially surrounds at least portions of the free ends of adapter members 14' and 15'. Spacer members 25' and 26', and optional stop member 28' may be the same as those various alternative embodiments discussed with respect to FIGS. 1–6, including those alternative configurations having widened portions. Stop member 28', if provided, typically may not require any form of affixation, to keep it in place within outer member 20', inasmuch as the materials from which stop member 28' (or stop member 28) may be configured, are such that stop member 28' will be relatively stiff (though at least somewhat resilient), and have substantial body. In addition, stop member 28' will preferably be dimensioned so that a very slight radial compression of stop member 28' will take place upon insertion into outer member 20'.

The alternative coupler apparatus 10' is contemplated as functioning, in its compression, extension, and bending modes in substantially the same manner as the embodiments of FIGS. 1–6.

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

What is claimed is:

1. A flexible coupler apparatus for connecting adjacent ends of successive pipes to direct fluid flow from one of the two pipes to the other of the two pipes, while precluding transmission of vibration between the two pipes, the flexible coupler apparatus comprising:

a first adapter having a first end configured to be operably affixed to a first one of the two pipes, and a second free end;

a second adapter member having a first end configured to be operably affixed to a second one of the two pipes, and a second free end, the second free ends of the first and second adapter members being normally disposed in an axially spaced relationship, when the first and second adapter members are affixed to the first and second pipes, respectively, and the coupler apparatus is in an unstressed state;

an inner member, having two free ends, which are insertingly received in respective ones of the second free ends of the first and second adapter members, the two free ends of the inner member being further circumferentially surrounded by the second free ends of the first and second adapter members, respectively;

at least first and second resilient spacer members, operably and radially disposed between a first free end of the inner member and a free end of one of the first and second adapter members, and a second free end of the inner member and a free end of the other of the first and second adapter members, respectively, for absorbing vibrations originating from one of the first and second pipes, and for precluding transmission of the vibrations to the other of the pipes, means for axially enclosing the at least first and second resilient spacer members, respectively, between the free ends of the inner member and the respective free ends of the first and second adapter members, at least a portion of each of the at least first and second resilient spacer members being further operably disposed for axial movement relative to at least one of the inner member, the first adapter member and the second adapter member, respectively; and a resilient sealing member at least indirectly affixed to the first and second pipes, to preclude escape of fluid from the flexible coupler apparatus and for maintaining the first and second pipes in flexibly joined relation to each other to accommodate and enable substantial compressive and extensive axial movement of the first and second pipes relative to one another, and to accommodate orientation of the pipes such that longitudinal axes thereof are positioned in a non-intersecting relationship.

2. The flexible coupler apparatus according to claim 1, further comprising:

at least one stop member operably disposed about the inner member and operably configured to prevent direct axially abutting contact between the first and second adapter members.

3. The flexible coupler apparatus according to claim 2, wherein at least one of said at least one stop member comprises:

an annular member, having an axial width around its circumference, wherein at at least one region along the circumference, the axial width is substantially greater than at other regions along the circumference.

4. The flexible coupler apparatus according to claim 3, wherein at least one stop member is affixed to the inner member.

5. The flexible coupler apparatus according to claim 1, wherein the resilient sealing member further comprises a flexible tubular bellows member having formed thereon a plurality of circumferential undulations along its length.

6. The flexible coupler apparatus according to claim 1, wherein each spacer member comprises:

a resilient annular member fabricated from metal wire mesh.

7. The flexible coupler apparatus according to claim 1, wherein each spacer member comprises:

a resilient annular member fabricated from ceramic wool material.

8. The flexible coupler apparatus according to claim 1, wherein at least one of said at least two spacer members comprise:

a resilient substantially annular member, having an axial width around its circumference, wherein at at least one region along the circumference, the axial width is substantially greater than at other regions along the circumference.

9. The flexible coupler apparatus according to claim 8, wherein at least one of the spacer members is affixed to the inner member.

10. The flexible coupler apparatus according to claim 1, further comprising:

at least one stop member operably disposed about and affixed to the inner member and operably configured to prevent direct axially abutting contact between the first and second adapter members.

11. A flexible coupler apparatus for connecting adjacent ends of successive pipes to direct fluid flow from one of the two pipes to the other of the two pipes, while precluding transmission of vibration between the two pipes, the flexible coupler apparatus comprising:

a first adapter member having a first end configured to be operably affixed to a first one of the two pipes, and a second free end;

a second adapter member having a first end configured to be operably affixed to a second one of the two pipes, and a second free end, the second free ends of the first and second adapter members being normally disposed in an axially spaced relationship, when the first and second adapter members are affixed to the first and second pipes, respectively, and the coupler apparatus is in an unstressed state;

an inner member, having two free ends, which are insertingly received in respective ones of the second free ends of the first and second adapter members, the two free ends of the inner member being further circumferentially surrounded by the second free ends of the first and second adapter members, respectively;

at least first and second resilient spacer members, operably and radially disposed between a first free end of the inner member and a free end of one of the first and second adapter members, and a second free end of the inner member and a free end of the other of the first and second adapter members, respectively, for absorbing vibrations originating from one of the first and second pipes, and for precluding transmission of the vibrations to the other of the pipes, means for axially enclosing the at least first and second resilient spacer members, respectively, between the respective free ends of the inner member and the respective free ends of the first and second adapter members, at least a portion of each of the at least first and second resilient spacer members being further operably disposed for axial movement relative to at least one of the inner member, the first adapter member and the second adapter member, respectively; and a resilient sealing member at least indirectly affixed to the first and second pipes, to preclude escape of fluid from the flexible coupler apparatus and for maintaining the first and second pipes in flexibly joined relation to each other to accommodate and enable substantial compressive and extensive axial movement of the first and second pipes relative to one another, and to accommodate orientation of the pipes such that longitudinal axes thereof are positioned in a non-intersecting relationship, the resilient sealing member being operably configured to circumferentially surround and extend axially over the entirety of the inner member, the at least first and second spacer members, and at least a portion of at least one of the first and second adapter members, and overlap at least a portion of each of the two pipes.

12. The flexible coupler apparatus according to claim 11, further comprising:

at least one stop member operably disposed about the inner member and operably configured to prevent direct axially abutting contact between the first and second adapter members.

13. The flexible coupler apparatus according to claim 12, wherein at least one of said at least one stop member comprises:

an annular member, having an axial width around its circumference, wherein at at least one region along the circumference, the axial width is substantially greater than at other regions along the circumference.

14. The flexible coupler apparatus according to claim 13, wherein at least one stop member is affixed to the inner member.

15. The flexible coupler apparatus according to claim 11, wherein the resilient sealing member further comprises a flexible tubular bellows member having formed thereon a plurality of circumferential undulations along its length.

16. The flexible coupler apparatus according to claim 11, wherein each spacer member comprises:

a resilient annular member fabricated from metal wire mesh.

17. The flexible coupler apparatus according to claim 11, wherein each spacer member comprises:

a resilient annular member fabricated from ceramic wool material.

18. The flexible coupler apparatus according to claim 11, wherein at least one of said at least two spacer members comprise:

a resilient substantially annular member, having an axial width around its circumference, wherein at at least one region along the circumference, the axial width is substantially greater than at other regions along the circumference.

19. The flexible coupler apparatus according to claim 18, wherein at least one of the spacer members is affixed to the inner member.

20. The flexible coupler apparatus according to claim 11, further comprising:

at least one stop member operably disposed about and affixed to the inner member and operably configured to prevent direct axially abutting contact between the first and second adapter members.

21. A flexible coupler apparatus for connecting adjacent ends of successive pipes to direct fluid flow from one of the two pipes to the other of the two pipes, while precluding transmission of vibration between the two pipes, the flexible coupler apparatus comprising:

a first adapter member having a first end configured to be operably affixed to a first one of the two pipes, and a second free end;

a second adapter member having a first end configured to be operably affixed to a second one of the two pipes, and a second free end, the second free ends of the first and second adapter members being normally disposed in an axially spaced relationship, when the first and second adapter members are affixed to the first and second pipes, respectively, and the coupler apparatus is in an unstressed state;

an outer member, having two free ends, which insertingly receive respective ones of the second free ends of the first and second adapter members, the two free ends of the outer member further circumferentially surrounding the second free ends of the first and second adapter members, respectively;

at least first and second resilient spacer members, operably and radially disposed between a first free end of the outer member and a free end of one of the first and second adapter members, and a second free end of the outer member and a free end of the other of the first and second adapter members, respectively, for absorbing vibrations originating from one of the first and second pipes, and for precluding transmission of the vibrations to the other of the pipes, means for axially enclosing the at least first and second resilient spacer members, respectively, between the free ends of the outer member and the respective free ends of the first and second adapter members, at least a portion of each of the at least first and second resilient spacer members being further operably disposed for axial movement relative to at least one of the outer member, the first adapter member and the second adapter member, respectively; and a resilient sealing member at least indirectly affixed to the first and second pipes, to preclude escape of fluid from the flexible coupler apparatus and for maintaining the first and second pipes in flexibly joined relation to each other to accommodate and enable substantial compressive and extensive axial movement of the first and second pipes relative to one another, and to accommodate orientation of the pipes such that longitudinal axes thereof are positioned in a non-intersecting relationship.

22. The flexible coupler apparatus according to claim 21, further comprising:

at least one stop member operably disposed within the outer member and operably configured to prevent direct axially abutting contact between the first and second adapter members.

23. The flexible coupler apparatus according to claim 22, wherein at least one of said at least one stop member comprises:

an annular member, having an axial width around its circumference, wherein at at least one region along the circumference, the axial width is substantially greater than at other regions along the circumference.

24. The flexible coupler apparatus according to claim 23, wherein at least one stop member is affixed to the outer member.

25. The flexible coupler apparatus according to claim 21, wherein the resilient sealing member further comprises a flexible tubular bellows member having formed thereon a plurality of circumferential undulations along its length.

26. The flexible coupler apparatus according to claim 21, wherein each spacer member comprises:

a resilient annular member fabricated from metal wire mesh.

27. The flexible coupler apparatus according to claim 21, wherein each spacer member comprises:

a resilient annular member fabricated from ceramic wool material.

28. The flexible coupler apparatus according to claim 21, wherein at least one of said at least two spacer members comprise:

a resilient substantially annular member, having an axial width around its circumference, wherein at at least one region along the circumference, the axial width is substantially greater than at other regions along the circumference.

29. The flexible coupler apparatus according to claim 28, wherein at least one of the spacer members is affixed to the outer member.

* * * * *

UNITED STATES PATENT AND TRADEMARK OFFICE
CERTIFICATE OF CORRECTION

PATENT NO. : 5,639,127
DATED : June 17, 1997
INVENTOR(S) : Mark John Davey

It is certified that error appears in the above-indentified patent and that said Letters Patent is hereby corrected as shown below:

Col. 9, Line 49         After "adapter" insert --member--

Signed and Sealed this

Twenty-seventh Day of January, 1998

Attest:

BRUCE LEHMAN

Attesting Officer     Commissioner of Patents and Trademarks